Jan. 2, 1962  H. W. SEMAR  3,015,523
VIBRATION ISOLATING BEARING SUPPORT
Filed May 4, 1960
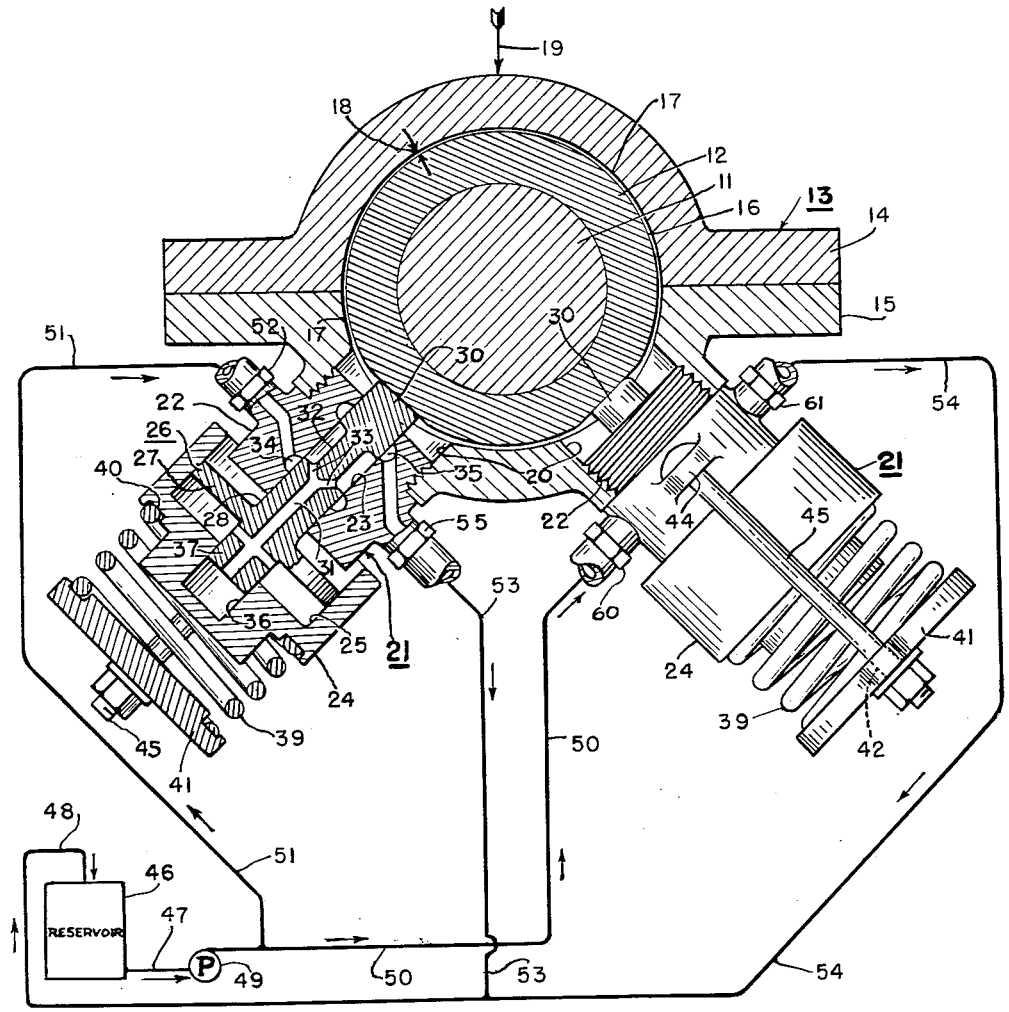
INVENTOR
HAROLD W. SEMAR 3,015,523
VIBRATION ISOLATING BEARING SUPPORT
Harold W. Semar, Drexel Hill, Pa., assignor to Westinghouse Electric Corporation, East Pittsburgh, Pa., a corporation of Pennsylvania
Filed May 4, 1960, Ser. No. 26,752
7 Claims. (Cl. 308—9)

The invention relates to vibration isolating bearing supports, more particularly to an arrangement for minimizing transmission of vibration from a rotating shaft to its bearing support structure.

Although not limited thereto, the invention is particularly suitable for isolating the transverse vibrations induced in the rotating shaft of a turbine propulsion power plant, for example, a submarine propulsion power plant. Although submarines are difficult to detect when submerged with their propulsion apparatus not in operation, they are readily detectible by sonar detecting devices when their propulsion apparatus is in operation, due to the inherent vibrations of the propulsion apparatus.

In view of the above, it is a further object of the invention to provide apparatus for isolating vibrations induced in the rotor of a power plant employed to propel a submarine or similar apparatus which is adapted to travel in a submerged condition below the surface of the water.

A further object of the invention is to provide apparatus for isolating vibrations of high frequency by absorbing these high frequency vibrations with a soft spring reaction while absorbing low frequency reactions with a harder spring reaction.

Briefly, according to the invention, there are provided at least two angularly spaced vibration isolating mechanisms cooperatively associated with the bearing which rotatably supports the journal portion of a rotatable shaft. The bearing may be of the usual cylindrical sleeve type received within a pedestal. The bearing, however, is of somewhat smaller outer diameter than the inner diameter of the pedestal bore within which it is received, thereby providing an annular clearance permitting movement of the shaft and bearing in any radial direction, to a limited degree, before striking the wall surface of the pedestal bore.

Since the vibration isolating mechanisms may be identical, only one need be described. The vibration isolating mechanism is provided with an anchoring portion attached to the lower portion of the pedestal and having a bore extending therethrough radially relative to the bearing and rotatable shaft. The anchoring portion is provided with an inlet port communicating with a source of high pressure liquid such as oil, and an outlet port for scavenging the liquid therefrom. There is further provided a housing member forming a cylindrical chamber and having received therein a piston member slidably movable in radially inwardly and outwardly directions. The piston member is provided with passages in continuous communication with the chamber and arranged to communicate with either the inlet port or the outlet port, as determined by the position of the piston member. The piston member further has an axially elongated portion which extends through the anchoring member and is maintained in continuous biased abutment with the outer face of the bearing by the pressure of the liquid disposed in the chamber, as well as by pressure of a spring member biasing the housing member toward the bearing.

The inlet and outlet ports are so arranged that, when the bearing is disposed in the center of the clearance with the pedestal bore, both the inlet and outlet ports are blocked, so that the bearing is supported by the spring member. During vibration, the shaft will tend to displace the bearing radially. When the bearing is so displaced by vibrations of high frequency and amplitude, the piston member will move rapidly radially outwardly and inwardly, thereby opening and closing the inlet and outlet ports so rapidly that no high pressure liquid is either admitted to or bled from the chamber. Accordingly, the bearing vibration reaction, during such conditions, is opposed by the spring member, and the piston member and housing member will move as one unit.

When the bearing is displaced by vibration forces of low frequency, the piston member will follow movement of the bearing more slowly, thereby alternately opening and closing the inlet and outlet ports and concomitantly admitting as much of the high pressure liquid to the chamber and bleeding liquid from the chamber as necessary to modify the bias of the piston member against the bearing. The downward action of gravity, when the rotatable shaft is disposed with its longitudinal axis horizontal, is of a sufficiently high order to provide sufficient force to maintain the bearing in normally continuous abutment with the piston member. Accordingly, during movement of the bearing caused by low frequency vibration of the rotatable shaft, the piston member is concomitantly urged by the bearing in radially inwardly or outwardly direction until equilibrium pressure is restored in the chamber. During such movement of the piston member, the housing is moved relative to the piston member thereby alternately increasing or decreasing the spring compression. Hence, vibration of the rotatable shaft which would otherwise be transmitted to the pedestal is substantially reduced, since the bearing is supported and maintained in substantially centered position within its clearance in the pedestal bore.

It is desirable to provide two of the vibration isolating mechanisms when the rotatable shaft is disposed for rotation about a horizontal axis. Under these circumstances, the vibration isolating mechanisms are angularly disposed with each other with their piston members movable along axes inclined about 45 degrees with a vertical line in a manner to support the rotatable shaft and its bearing. However, if desired, a third vibration isolating mechanism may be provided to control reaction forces on the bearing in upward direction, in which case the third mechanism would be disposed with its axis extending vertically and displaced angularly from the other two vibration isolating mechanisms about 135 degrees.

The foregoing and other objects are effected by the invention as will be apparent from the following description and claims taken in connection with the accompanying drawing, forming a part of this application, in which:

The sole figure is a schematic view illustrating a pair of vibration isolating mechanisms formed in accordance with the invention and applied to a rotatable shaft, and further shows a highly simplified hydraulic circuit for providing pressurized liquid thereto.

Referring to the drawing in detail, there is shown, in cross section, the journal portion 11 of a rotatable propulsion power plant shaft (not shown). The journal portion 11 is received in a cylindrical journal bearing or sleeve bearing 12, and the journal bearing, in turn, is supported in a pedestal mounting structure 13 divided into an upper portion 14 and lower portion 15. As well known in the art, the pedestal 13 is employed to support one end of the rotatable shaft of the propulsion apparatus and, accordingly, is secured to a suitable foundation (not shown). The journal bearing 12 has an outer circumferential surface 16 of smaller diameter than the internal surface of the pedestal bore 17 within which it is received, so that therebetween, there is provided a small annular clearance indicated at 18.

In the embodiment shown, the journal portion 11 is rotatable about a horizontal axis, so that the weight of its associated rotor structure provides a gravitational component exerted vertically downwardly as indicated by the arrow 19.

The lower pedestal portion 15 is provided with a pair of radially extending openings 20 angularly displaced from each other about 90 degrees and about 45 degrees from the vertical.

A pair of vibration isolating mechanisms 21 are attached to the lower pedestal portion by threaded or other suitable connections provided in the openings 20. Since the vibration isolating mechanisms 21 are substantially identical, only one will be described in detail. The vibration isolating mechanism 21 is provided with an anchoring portion 22 threadedly connected to the lower pedestal portion 15 and having a bore 23 extending therethrough in a radial direction relative to the axis of the journal portion 11 and its associated bearing 12. A cylindrical housing 24 defining a cylindrical chamber 25 is disposed in coaxial alignment with the bore 23 and disposed radially outwardly of the anchoring portion 22.

There is further provided a piston member 26 having a movable abutment or piston portion 27 slidably received in the cylindrical chamber 25 and an axially elongated rod portion 28 slidably received in the bore 23. The rod portion 28 has its radially innermost end portion 30 disposed in abutment with the outer face 16 of the bearing 12 and is further provided with a central passage 31 communicating at one end with the chamber 25. The rod portion 28 is further provided with an annular reduced portion 32 and the passageway 31 is provided with a pair of branches 33 communicating with the cavity formed between the reduced portion 32 and the bore 23 of the anchoring portion.

The anchoring portion 22 is further provided with an annular inlet port 34 and an annular outlet port 35. The inlet port is spaced radially outwardly from the outlet port and the rod portion 28 is so proportioned that when the bearing 12 is in its center position, as illustrated, both the inlet and outlet ports 34 and 35, respectively, are blocked.

The cylinder housing 24 is further provided with a central recess 36 arranged to slidably receive the outermost reduced end portion 37 of the rod portion 28. The cylinder housing 24 is biased in radial direction toward the bearing 12 by a helical spring 39. The spring 39 has one end received in abutment with an annular shoulder 40 formed on the cylinder housing 24 and its opposite end in abutment with an annular retaining plate 41. The retaining plate is further provided with a pair of openings 42 (only one shown) disposed in diametrically opposed relation with each other and in alignment with a pair of openings formed in diametrically opposed lugs 44 (only one shown) formed on the anchoring portion 22. A bolt 45 extends through each of the openings in the retaining plate 41 and the lugs 44 and is drawn up as necessary to adjust the compression of the spring 39.

Accordingly, with a following action, the cylinder housing 24 is biased radially inwardly and, through the liquid contained in the chamber 25, the rod portion 28 is biased against the bearing to support and maintain the latter within the clearance 18.

The liquid for the chamber 25 may be provided by any suitable pressurized liquid system, for example, by the system shown diagrammatically. This system includes a reservoir 46 containing a suitable liquid such as oil, or other hydraulic fluid, an outlet conduit 47 and an inlet conduit 48. In the outlet conduit 47 is disposed a suitable pump 49 for pressurizing the liquid and downstream thereof the conduit 47 is divided into two branches 50 and 51. The branch 51 is connected to a suitable fitting 52 communicating with the inlet port 34 of the vibration isolating mechanism 21 disposed at the left.

The return conduit 48 is also divided into a pair of branch conduits 53 and 54. The branch 53 is connected by a suitable connector 55 to the outlet port 35. Accordingly, highly pressurized hydraulic fluid is continuously provided to the vibration isolating mechanism 21 at the inlet port 34.

During operation of the propulsion apparatus, the journal 11 is rotated within the journal bearing 12 and any vibrations induced in the propulsion apparatus are transmitted to the journal portion 11 and thence to the journal bearing 12, thereby tending to move the journal bearing radially within its clearance 18 until further motion is arrested by the pedestal. However, the vibration isolating mechanism 21 is effective to exert a force in a direction opposite to that of the vibratory force, thereby minimizing the possibility of the journal bearing 17 striking the pedestal. The above is attained in the following two modes.

During low frequency vibrations or motions such as those caused by a load change on the turbine or the rolling and pitching motion of the vessel, as the vibration force is directed toward the vibration isolating mechanism 21, this force is transmitted to the rod portion 28 which is urged radially outwardly against the pressure of the spring 39 and the hydraulic fluid disposed in the chamber 25. Should the vibration force be preponderant thereover, the rod portion 28 is moved radially outwardly until the inlet port 34 is uncovered, thereby permitting high pressure liquid to flow through the passageways 33 and 31 into the chamber 25 to increase the volume of the liquid in the chamber until the hydraulic force on the piston member is sufficient to further compress the spring 39 and increase its bias. Hence the vibration force tending to radially displace the bearing is resisted with a harder spring reaction.

When the low frequency vibration force is in the opposite direction, that is, away from the vibration isolating mechanism, the rod 28 will follow the bearing due to the hydraulic pressure in the chamber 25 acting thereon, until the outlet port 35 is unblocked, thereby bleeding some of the liquid from the chamber 25 through the passages 31 and 33 until the spring compression is reduced and the force of the rod 28 on the bearing 17 is reduced sufficiently to restore the bearing to its centered position. It will be understood that, during this time, the opposing or reaction force acting upon the vibration isolating mechanism is provided by the gravitational effect of the rotor structure (not shown) acting along the direction of the arrow 19 and exerting a component force directly opposing the force of the vibration isolating mechanism, equal to $F \cos \theta$, where F is the gravitational force and $\theta$ is the angle which the axis of the rod portion 28 makes with the vertical. In this case angle $\theta$ is 45 degrees. As the liquid is bled from the chamber 25 through the outlet port 35, it is returned to the reservoir by way of return conduits 53 and 48 to replenish the reservoir 46.

During high frequency vibrations, such as those created by rotation of the turbine rotor, the piston member 26 moves rapidly in radially inwardly and outwardly directions, thereby opening and closing the inlet and outlet ports 34 and 35 so rapidly that substantially no high pressure liquid is admitted to or bled from the chamber 25. Since the liquid is substantially incompressible, the piston member 26 and the housing 24 will move as a unit. Hence the compression of the spring member 39 is unaltered and the bearing reaction is opposed by the soft spring reaction of the spring member.

The vibration isolating mechanism 21 disposed at the right functions in substantially the same manner as the vibration isolating mechanism 21 disposed at the left, and described above, and it will readily be seen that high pressure liquid is provided by supply conduit 50 thereto by a suitable inlet connector 60 and returned therefrom by return conduit 54 through a suitable outlet connector 61. Accordingly, with this arrangement any vibration of the journal portion 11 is isolated from the pedestal 13 jointly by the two vibration isolating mechanisms 21, while any upwardly directed vibrational forces are opposed by the gravitational effect. However, if desired, a third vibration isolating mechanism identical to the vibration isolating mechanism 21 described above may be provided at the position indicated by the arrow 19.

The vibration isolating mechanism 21 acts to provide a soft spring reaction of high impedance opposing the transmission of vibrations of high frequency and amplitudes from the bearing to the pedestal. That is, during periods of high frequency and high amplitude vibrations, the vibratory oscillation of the rod portion 28 is so rapid that the liquid in the chamber 25 is substantially confined therein and its volume is unchanged, so that the entire mechanism moves as a unit against the resistance of the spring member 39. This function is highly effective to prevent the transmission of high frequency vibrations to the pedestal 13.

During periods of low frequency vibrations, the oscillatory movement of the rod portion 28 is attained at a considerably slower rate of speed, so that high pressure oil may be admitted to augment the volume of the liquid in the chamber 25 during radially outward movement of the rod portion 28 and, conversely, liquid may be bled from the chamber 25 during radially inward movement of the rod portion 28. Accordingly, with increasing liquid volume the spring compression is increased, while with decreasing liquid volume the spring compression is decreased.

It will now be seen that the invention provides an arrangement for substantially eliminating or at least minimizing the transmission of vibrations from the rotating shaft of propulsion apparatus to its associated support structure.

During severe changes in load imposed upon the propulsion apparatus or a near miss of an exploding missile, the bearing reactions may be of such a sudden and severe nature that the bearing 12 may momentarily strike the pedestal and for this short time the vibration isolating mechanism would be ineffective to isolate these vibrations. However, since such severe vibrations happen so infrequently and are of short-lived duration, they are of little or no consequence.

While the invention has been shown in but one form, it will be obvious to those skilled in the art that it is not so limited, but is susceptible of various changes and modifications without departing from the spirit thereof.

What I claim is:

1. In combination, a rotatable shaft having a journal portion; a bearing for rotatably supporting said journal; a support structure for said bearing, there being an annular clearance space between said bearing and said support structure; and means for minimizing the transmission of vibration of said shaft to said support structure, said means comprising a member extending through said support structure into abutment with said bearing, means for slidably supporting said member, said member being movable in radial direction jointly with said journal portion, housing structure defining a chamber, said member having an abutment portion movably disposed in said chamber, a spring member, means for retaining said spring member in cooperative association with said housing, said spring member biasing said housing radially toward said bearing, a source of pressurized liquid, first passage structure for admitting some of said pressurized liquid to said chamber when said member is moved in radially outward direction by said bearing, said pressurized liquid in said chamber being effective to urge said housing radially outwardly against the bias of said spring member, and second passage structure for releasing some of the pressurized liquid from said chamber when said member is moved in radially inward direction, thereby to reduce the volume of liquid in said chamber and reduce the bias of said spring against said housing.

2. In combination, a rotatable shaft having a journal portion; a bearing for rotatably supporting said journal; a support structure for said bearing, there being an annular clearance space between said bearing and said support structure; and means for minimizing the transmission of vibration of said shaft to said support structure, said means comprising a member extending through said support structure into abutment with said bearing, means for slidably supporting said member, said member being movable in radial direction jointly with said journal portion, housing structure defining a chamber, said member having an abutment portion movably disposed in said chamber, a spring member, a retaining member for maintaining said spring member in cooperative association with said housing, said spring member and said retaining member being carried by said support structure, said spring member biasing said housing structure toward said bearing, first passage structure for admitting pressurized liquid to said chamber when said member is moved in radially outward direction by said bearing, said pressurized liquid in said chamber being effective to oppose radially outward movement of said member and radially inward movement of said housing, and second passage structure for releasing some of the pressurized liquid from said chamber when said member is moved in radially inward direction, thereby to reduce the liquid volume in said chamber acting on said member and said housing.

3. In combination, a rotatable shaft having a journal portion; a bearing for rotatably supporting said journal; a support structure for said bearing, said bearing and said support structure jointly defining an annular clearance space; and means for minimizing the transmission of high and low frequency vibrations of said shaft to said support structure, said means comprising a member having a rod portion extending through said support structure into abutment with said bearing, means for slidably supporting said rod portion, said member being movable in radial direction relative to said journal portion, housing structure defining a chamber, said member having a piston portion movably disposed in said chamber, a spring member, a spring retaining member for maintaining said spring member in cooperative association with said housing structure, said spring member and said retaining member being carried by said support structure, said spring member urging said housing structure toward said bearing, first passage structure for admitting pressurized liquid to said chamber when said member is moved in radially outward direction by said bearing, said pressurized liquid in said chamber being effective to urge said member toward said bearing and said housing toward said spring member, and second passage structure for releasing some of the pressurized liquid from said chamber when said member is moved in radially inward direction, thereby to reduce the volume of liquid in said chamber acting on said member and said housing, and said piston member and said housing structure being jointly movable during periods of high frequency vibration, against the resistance of said spring member.

4. In combination, a rotatable shaft subject to transverse vibrations and having a journal portion; an annular bearing for rotatably supporting said journal; a support structure encompassing said bearing, said bearing and said support structure jointly defining an annular clearance space; and means for minimizing the transmission of vibration of said shaft to said support structure, said means comprising a member extending through said support structure into abutment with said bearing, means for slidably supporting said member for movement in radial direction jointly with said journal portion, housing structure defining a chamber coaxially disposed with said member, said member having an abutment portion movably disposed in said chamber, a spring member, means for retaining said spring member in biased abutment with said housing, said spring member urging said housing structure radially toward said bearing, first passage structure for admitting pressurized liquid to said chamber when said member is moved in one direction by said bearing, said movable abutment portion being urged in radially inward direction by the bias of the spring acting on the pressurized liquid in said chamber, and said member being effective to support and maintain said bearing in said clearance space, and second passage structure for releasing some of the pressurized liquid from said chamber when said member is moved in an opposite direction, thereby to reduce the quantity of liquid acting on said movable abutment in said opposite direction.

5. In combination, a rotatable shaft subject to transverse vibrations and having a journal portion; an annular bearing encompassing and rotatably supporting said journal; a support structure for said bearing, said support structure having an annular bore in which said bearing is received, said bore having a larger diameter than said bearing and jointly therewith defining an annnular clearance space; and means for substantially maintaining said bearing out of contact with the wall of said bore during vibration of said shaft, thereby to minimize the transmission of vibrations from said shaft to said support structure, said last mentioned means comprising a piston member having an elongated rod portion and an enlarged piston portion, a cylinder housing having a chamber, said piston portion being slidably received in said chamber and said rod portion extending radially through said support structure into abutment with and supporting said bearing, a tubular anchoring portion connected to said support structure and having a bore through which said rod portion extends, said anchoring portion having an inlet port and an outlet port communicating with said last mentioned bore, said piston member having a passageway selectively communicable with said inlet and outlet ports and in continuous communication with said chamber, a source of pressurized hydraulic fluid, conduit means for supplying said pressurized fluid to said inlet port, conduit means for bleeding said fluid from said outlet port, a spring member, means for retaining said spring member in biased abutment with said housing, said spring member biasing said housing toward said piston member, said piston member and said housing assuming relative positions in which the volume of hydraulic fluid admitted to said chamber through said inlet port and passageway transmits the bias of said spring member radially inwardly against said piston which substantially balances the radially outwardly directed gravitational force of said journal portion and bearing, said piston member uncovering said outlet port upon radially inward movement to reduce the volume of hydraulic fluid in said chamber and decrease the spring bias.

6. In combination, a rotatable shaft subject to transverse vibrations and having a journal portion; an annular bearing encompassing and rotatably supporting said journal; a support structure for said bearing, said support structure having an annular bore in which said bearing is received, said bore having a larger diameter than said bearing and jointly therewith defining an annular clearance space; and means for substantially maintaining said bearing out of contact with the wall of said bore during vibration of said shaft, thereby to minimize the transmission of vibrations from said shaft to said support structure, said last-mentioned means comprising a piston member having an elongated rod portion and an enlarged piston portion, a cylinder housing having a chamber, said piston portion being slidably received in said chamber and said rod portion extending radially through said support structure into abutment with and supporting said bearing, a tubular anchoring portion connected to said support structure and having a bore through which said rod portion extends, said anchoring portion having an inlet port and an outlet port communicating with said last-mentioned bore, said piston member having an axially extending passageway selectively communicable with said inlet and outlet ports and in continuous communication with said chamber, a spring member, a retainer for maintaining said spring member in compressive abutment with said cylinder housing, said spring member biasing said cylinder housing in radial direction toward said bearing, a source of pressurized hydraulic fluid, conduit means for supplying said pressurized fluid to said inlet port, conduit means for bleeding said fluid from said outlet port, said piston member and said housing assuming relative positions determined by the quantity of hydraulic fluid admitted to said chamber through said inlet port and passageway and modifying the bias of said spring, so that the radially inwardly directed force on said piston substantially balances the radially outwardly directed gravitational force of said journal portion and bearing, said piston member uncovering said outlet port upon radially inward movement to reduce the volume of the hydraulic fluid in said chamber with concomitant relative repositioning of said housing and said piston member.

7. In combination, a rotatable shaft subject to transverse vibrations and having a journal portion; an annular bearing for rotatably supporting said journal; a support structure encompassing said bearing, there being an annular clearance space between said bearing and said support structure; and means for minimizing the transmission of vibration of said shaft to said housing, said means comprising a piston member having a rod portion extending through said support structure into abutment with said bearing, an anchoring member for slidably supporting said piston member for movement in radial direction relative to said journal portion, a housing defining a chamber coaxially disposed with said piston member, said piston member having an enlarged piston portion movably disposed in said chamber, a spring member, a retainer connected to said anchoring member, said retainer maintaining said spring member in compressive abutment with said houisng, said spring member urging said housing radially toward said bearing, said housing and said spring member being carried by said anchoring member, first passage structure for admitting pressurized liquid to said chamber when said member is moved in one direction by said bearing, said housing being urged in radially outward direction by the pressurized liquid in said chamber, and said member being effective to support and maintain said bearing in said clearance space, and second passage structure for releasing some of the pressurized liquid from said chamber when said member is moved in an opposite direction, thereby to reduce the liquid volume acting on said housing.

References Cited in the file of this patent

UNITED STATES PATENTS

| | | |
|---|---|---|
| 2,225,761 | Asbridge | Dec. 24, 1940 |
| 2,631,901 | Holben et al. | Mar. 17, 1953 |
| 2,729,518 | O'Conner | Jan. 3, 1956 |
| 2,858,173 | Leibach | Oct. 28, 1958 |

FOREIGN PATENTS

| | | |
|---|---|---|
| 441,974 | Great Britain | Jan. 30, 1936 |